US012408041B2

(12) United States Patent
Garcia-Saavedra et al.

(10) Patent No.: US 12,408,041 B2
(45) Date of Patent: Sep. 2, 2025

(54) VIRTUALIZED RAN SLICING WITH BANDWIDTH PARTS

(71) Applicant: NEC Laboratories Europe GmbH, Heidelberg (DE)

(72) Inventors: Andres Garcia-Saavedra, Heidelberg (DE); Xavier Costa-Perez, Heidelberg (DE)

(73) Assignee: NEC CORPORATION, Tokyo (JP)

(*) Notice: Subject to any disclaimer, the term of this patent is extended or adjusted under 35 U.S.C. 154(b) by 453 days.

(21) Appl. No.: 17/997,931

(22) PCT Filed: Jun. 4, 2020

(86) PCT No.: PCT/EP2020/065417
§ 371 (c)(1),
(2) Date: Nov. 4, 2022

(87) PCT Pub. No.: WO2021/244742
PCT Pub. Date: Dec. 9, 2021

(65) Prior Publication Data
US 2023/0217256 A1 Jul. 6, 2023

(51) Int. Cl.
*H04W 16/10* (2009.01)
*H04W 72/232* (2023.01)

(52) U.S. Cl.
CPC ......... *H04W 16/10* (2013.01); *H04W 72/232* (2023.01)

(58) Field of Classification Search
CPC ............... H04W 16/10; H04W 72/232; H04W 24/08; H04W 72/0453; H04W 88/085; H04W 48/18; H04W 72/51; H04L 5/001; H04L 5/0085; H04L 5/0087; H04L 5/0064

See application file for complete search history.

(56) References Cited

U.S. PATENT DOCUMENTS

2018/0184413 A1* 6/2018 Rong ................. H04W 76/10
2022/0061094 A1* 2/2022 Jung ................. H04W 74/0816

FOREIGN PATENT DOCUMENTS

CA 3078515 A1 * 4/2019 ............ H04W 72/30
CN 112385283 A * 2/2021 ............ H04W 72/23

OTHER PUBLICATIONS

Machine Translation of Harada (Year: 2017).*
Machine Translation of Hou (Year: 2018).*
(Continued)

*Primary Examiner* — Khaled M Kassim
*Assistant Examiner* — Noah James Sugden
(74) *Attorney, Agent, or Firm* — Leydig, Voit & Mayer, Ltd.

(57) ABSTRACT

A method for dynamically allocating radio resources across a set of virtualized radio access points (vRAPs) in a virtual radio access network (vRAN) includes collecting contextual information across all vRAPs that share a common carrier bandwidth of a physical radio access point. The method also includes mapping, by a radio resource controller according to an internal mapping policy, the contextual information of the vRAPs into an allocation of vRAN slices to the vRAPs, wherein each vRAN slice comprises allocated computing resources and an allocated bandwidth part (BWP) of the common carrier bandwidth, the BWPs being orthogonal across the vRAN slices. The method also includes notifying the vRAPs of the allocated BWP.

13 Claims, 5 Drawing Sheets

(56) References Cited

OTHER PUBLICATIONS

Bega, Dario et al.; "Network Slicing Meets Artificial Intelligence: An AI-Based Framework for Slice Management"; *Data Science and Artificial Intelligence for Communications*; Jun. 1, 2020; pp. 32-38; vol. 58, No. 6; XP011798616; IEEE Communications Magazine, IEEE Service Center; Piscataway, NJ, USA.

Ayala-Romero, Jose A. et al.; "vrAIn: A Deep Learning Approach Tailoring Computing and Radio Resources in Virtualized RANs"; *Mobile Computing and Networking*; Oct. 11, 2019; pp. 1-16; XP058475500; Association for Computing Machinery; New York, NY, USA.

Mendes, Jose et al.; "Cellular access multi-tenancy through small-cell virtualization and common RF front-end sharing"; *Computer Communications*; Nov. 3, 2018; pp. 59-66; vol. 133; Elsevier; Amsterdam, Netherlands.

Pereira De Figueiredo, Felipe A. et al.; "A Base-Band Wireless Spectrum Hypervisor for Multiplexing Concurrent OFDM signals"; *Sensors*; Nov. 15, 2019; pp. 1-18; vol. 20, No. 4; MDPI; Basel, Switzerland.

\* cited by examiner

VIRTUALIZED RAN SLICING WITH BANDWIDTH PARTS

CROSS REFERENCE TO RELATED APPLICATIONS

This application is a U.S. National Phase application under 35 § 371 of International Application No. PCT/EP2020/065417, filed on Jun. 4, 2020. The International Application was published in English on Dec. 9, 2021, as WO 2021/244742 A1 under PCI Article 21(2).

FIELD

The present invention relates to a method and a system for dynamically allocating radio resources across a set of virtualized radio access points, vRAPs, in a virtual radio access network, vRAN.

BACKGROUND

Network slicing is one of the key technologies for 5G and beyond that will allow network operators to minimize costs and support tailor-made services via virtualization and resource sharing. While 3GPP (3rd Generation Partnership Project) has standardized the means to manage network slices, ETSI's (European Telecommunications Standards Institute) NFV (Network Functions Virtualisation) has standardized the means to virtualize network and computing infrastructure to enable network slices. The former guarantees that each network slice preserves all network functions required to function as a logical fully functional mobile network. The latter enables multiple network slices sharing a common network and computing infrastructure.

Network slicing at the radio access network (RAN) is considerably harder to achieve. A key challenge is the design of a RAN virtualization mechanism that jointly (i) provides isolation between network slices, and (ii) adapts the allocation of pooled physical resources to the needs of each virtual radio access point (vRAP).

FIG. 1 schematically illustrates three possible strategies to address this challenge. "Network A" and "Network B" in the example of FIG. 1 illustrate a strategy of full isolation. According to this strategy, vRAPs only share IT resources such as computing or memory resources; however, each vRAP's BBU (Baseband Unit) or DU (Distributed Unit) use a dedicated RU (Radio Unit) associated with dedicated radio spectrum.

Alternatively, in a RU sharing strategy, vRAPs also leverage fully-isolated virtualized BBUs or DUs (like BBU 3 and 4 in FIG. 1); however, unlike the previous case, vBBUs or vDUs share a common radio front-end in addition to the pool of computing resources, multiplexing modulated radio signals in virtually isolated bandwidths into a common frequency band.

Still another approach is DU sharing: An alternative to deploy network slicing at the RAN is to share one or multiple functions of the BBU or DU stack, e.g., PHY in the case of BBU 5 and 6 in FIG. 1 by means of a PRY hypervisor, PHY+MAC when using a slice-aware radio scheduler, or even full BBU stacks. This approach has the advantage of allowing for highly optimized vRAP processors as, e.g., a PHY hypervisor avoids redundancy such as (I)FFT ((Inverse) Fast Fourier Transformation) operations from multiple fully isolated BBUs/DUs. The disadvantage is the need for modifications in the layers of the protocol stack that are shared.

In either of the above cases it remains a challenge though, how to slice and share a common radio band. In this context, J. Mendes, X. Jiao, A. Garcia-Saavedra, F. Huici, I. Moerman. Cellular access multi-tenancy through small-cell virtualization and common RF front-end sharing. In Elsevier COMCOM, 2018 describe a RU sharing approach, which is transparent to the vRAP stacks. However, it is a static solution that is unable to allocate radio resources across vRAPs dynamically and, therefore, incapable of maximizing spectral efficiency in real-life environments. Another approach, which is a DU sharing solution, is described in Pereira de Figueiredo, F. A.; Mennes, R.; Jabandzic, I.; Jiao, X.; Moerman, I. A Base-Band Wireless Spectrum Hypervisor for Multiplexing Concurrent OFDM signals. Preprints 2019, 2019110180 (doi: 10.20944/preprints201911.0180.v1). This approach employs a PHY hypervisor to allocate radio resources across vRAPs. However, this is also a static solution that does not allow modifying the amount of bandwidth allocated to each vRAP in an online manner.

SUMMARY

In an embodiment, the present disclosure provides a method for dynamically allocating radio resources across a set of virtualized radio access points (vRAPs) in a virtual radio access network (vRAN). The method comprises: collecting contextual information across all vRAPs that share a common carrier bandwidth of a physical radio access point, mapping, by a radio resource controller according to an internal mapping policy, the contextual information of the vRAPs into an allocation of vRAN slices to the vRAPs, wherein each vRAN slice comprises allocated computing resources and an allocated bandwidth part (BWP) of the common carrier bandwidth, the BWPs being orthogonal across the vRAN slices, and notifying the vRAPs of their individual BWP allocations.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
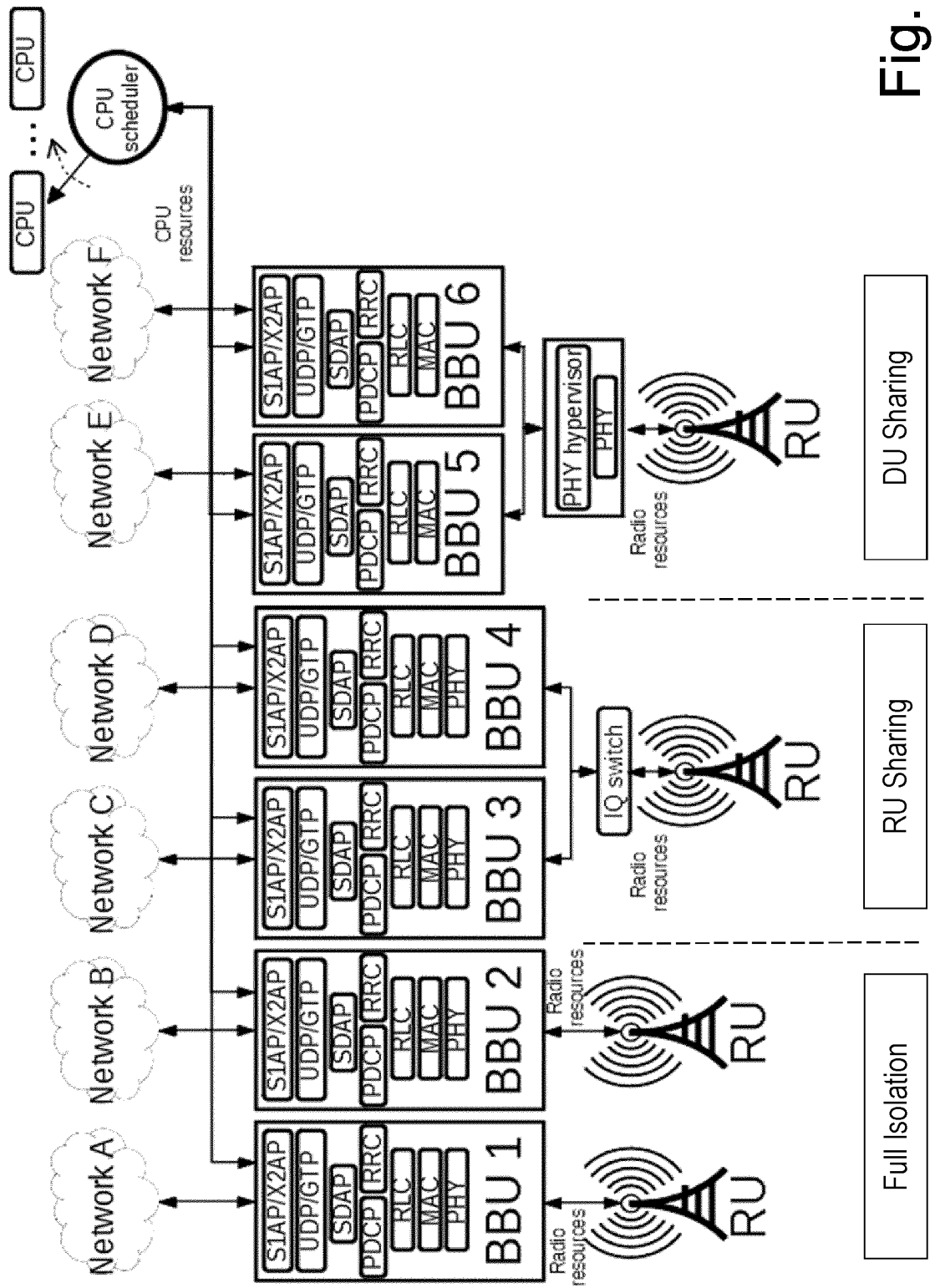
FIG. 1 is a schematic view illustrating different types of RAN slicing.

In an embodiment, the present invention improves and further develops a method and a system of the initially described type in such a way that radio spectrum can be allocated across a set of virtualized radio access points (vRAPs) sharing a common wideband in an efficient and dynamic way.

In accordance with another embodiment, the present invention provides a method of dynamically allocating radio resources across a set of virtualized radio access points, vRAPs, in a virtual radio access network, vRAN, the method comprising:
 collecting contextual information across all vRAPs that share a common carrier bandwidth of a physical radio access point,
 mapping, by a radio resource controller according to an internal mapping policy, the contextual information of the vRAPs into an allocation of vRAN slices to the vRAPs, wherein each vRAN slice comprises allocated computing resources and an allocated bandwidth part, BWP, of the common carrier bandwidth, the BWPs being orthogonal across the vRAN slices, and
 notifying the vRAPs of their individual BWP allocations.

In accordance with another embodiment, the present invention provides a system for dynamically allocating radio resources across a set of virtualized radio access points, vRAPs, in a virtual radio access network, vRAN, the system comprising:
 a radio resource controller that is configured to execute a mapping policy that maps contextual information collected across all vRAPs that share a common carrier bandwidth of a physical radio access point into an allocation of vRAN slices to the vRAPs, wherein each vRAN slice comprises allocated computing resources and an allocated bandwidth part, BWP, of the common carrier bandwidth, the BWPs being orthogonal across the vRAN slices, and
 communication means for notifying the vRAPs of their individual MVP allocations.

In accordance with another embodiment, A the present invention provides an intelligent radio resource controller that optimizes the allocation radio spectrum across a set of virtualized radio access points (vRAPs) sharing a common wideband, e.g., when sharing a common RF front-end in multi-tenancy scenarios. The controller is configured to maintain a parametrized policy that allocates vRAN slices to vRAPs based on contextual information available for the individual vRAPs. Due to existing correlations between bandwidth allocations and CPU requirements for virtualized radio access points, the radio resource controller may be configured to optimize both BWP allocations and CPU allocations jointly. As such, embodiments of the invention provide a method for slicing a radio channel in virtual radio access networks having the advantage of enabling a more efficient usage of scarce spectrum in beyond 5G sliced networks.

According to embodiments, given a system with multiple virtual radio access points (vRAPs) sharing a common carrier bandwidth, the method of dynamic radio resource comprises a) measuring contextual information across all vRAPs, including computing resource availability, channel quality patterns and/oder users' buffer state patterns, b) mapping said contextual information into a set of vRAN slices, each slice comprised of allocated computing resources (CPU, memory, etc.) and one bandwidth part (BWP) orthogonal across slices, and c) notifying each vRAP of the allocated BWP, which in turn notifies its own users for synchronization via explicit signaling.

According to embodiments, the contextual information about the vRAPs that is measured and utilized by the radio resource controller for the allocation of resources to the vRAPs, may include computing availability conditions, channel quality temporal patterns, and/or buffer state patterns.

According to embodiments, the radio resource controller may be configured to maintain an internal parametrized mapping policy that comprises, e.g. a set of neural networks. In this case, the weights of the neural networks are the parameters of the policy. Alternatively, the mapping policy may be implemented in form of a parametrized function that is fitted as new contextual data about the vRAPs comes in to map encoded information about the context into optimal bandwidth and computing allocations.

According to an embodiment, the radio resource controller may be configured to compute statistics of a set of performance indicators per vRAP and/or on computing resource utilization per vRAP. Based on the computed statistics the radio resource controller may adapt the parameters of its internal mapping policy. The performance indicators may relate to, e.g., mean/variance delay, throughput, decoding errors, etc., while the computing resource utilization may include the CPU utilization per vRAP as well as the CPU usage for other uses, e.g. other applications such as edge computing applications, etc.

According to embodiments, the radio resource controller may be configured to compute a set of BWP vectors containing BWPs eligible for each vRAP using a distance function to guarantee, by maximizing the distance function, a sufficiently diverse set of eligible BWPs for individual vRAPs across all BWP vectors. In this context, an initial BWP vector may be chosen that contains default BWPs for each vRAP, and the radio resource controller may signal to each vRAP the set of eligible BWPs which, accordingly, could be used by the PHY hypervisor, and its default BWP. The radio resource controller may then use 3GPP specification on BWPs so each vRAP signals its own users changes on active BWP one by one following some schedule. More specifically, the schedule may determine iterations in time intervals, e.g., in a round-robin fashion, across all vRAPs. At each interval, one different vRAP activates and communicates to its users, using all the bandwidth of the common carrier bandwidth, CB, the eligible BWPs and the default BWP, which should become active when the system has finished iterating across vRAPs.

According to embodiments, a control communication channel may be provided that is utilized by individual vRAPs for advertising to the users the channel characteristics of their allocated radio resources. Such advertising may comprise transmitting notifications that include information about the central frequency and the bandwidth of the allocated radio resources. Specifically, according to an embodiment, these information on the channel characteristics of the radio resources allocated to a particular vRAP may be encoded into the Downlink Control Information, DCI, in 3GPP.

According to embodiments, time may be divided into BWP scheduling slots that may be used for synchronization purposes. For instance, it may be provided that the radio resource controller notifies individual vRAPs within a scheduling slot t of BWP allocations made for the respective next scheduling slot t+1. Generally, it may be provided that resource allocations may vary from scheduling slot to scheduling slot, but remain constant within each scheduling slot. However, the radio resource controller may be enabled to re-compute allocations also within a scheduling slot, if required. For instance, such a re-computation may be performed in case of (unexpected or sudden) changes of a vRAP's context that exceed a predefined threshold.

There are several ways how to design and further develop the teaching of the present invention in an advantageous way. To this end it is to be referred to the dependent patent claims on the one hand and to the following explanation of preferred embodiments of the invention by way of example, illustrated by the figure on the other hand. In connection with the explanation of the preferred embodiments of the invention by the aid of the figure, generally preferred embodiments and further developments of the teaching will be explained.

Figure 2:
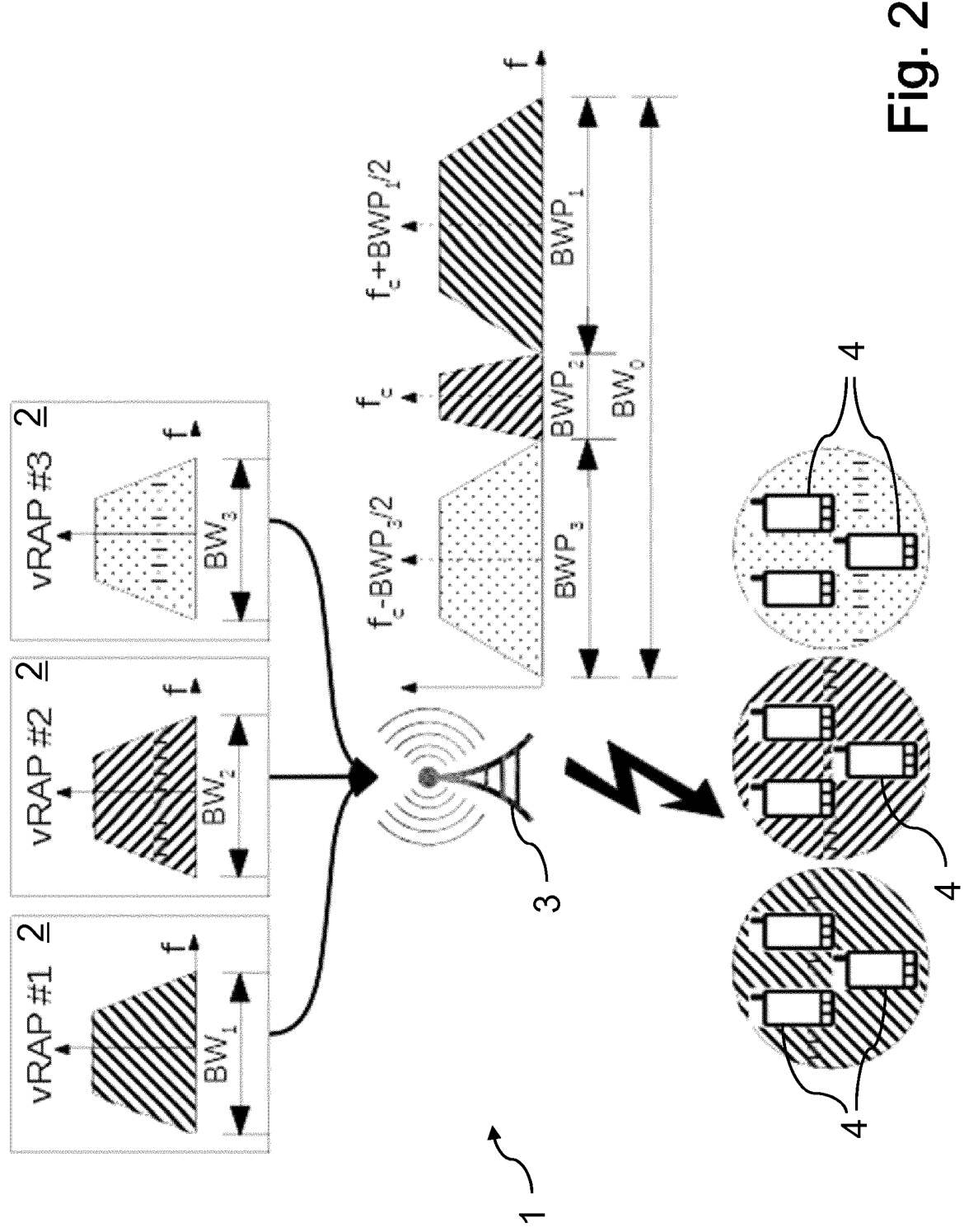
FIG. 2 is a schematic view illustrating spectrum sharing across vRAPs of a vRAN in accordance with an embodiment of the present invention.

FIG. 2 schematically illustrates a vRAN scenario 1 with spectrum sharing across vRAPs 2. More specifically, FIG. 2 shows a physical radio access point 3 with radio resources shared among three vRAPs 2. The shared radio resources include a common channel of bandwidth equal to $BW_0$ Hz around a carrier frequency $f_c$. Each vRAP 2 is allocated a chunk of such channel, hereinafter sometimes denoted bandwidth parts (BWP), to provide a communication (sub) channel to the users 4 of each vRAP. For instance, as shown in FIG. 2, vRAP #2 is allocated a bandwidth part denoted $BWP_2$ around carrier frequency $f_c$, while vRAP #1 and vRAP #3, respectively, are allocated bandwidth part $BWP_1$ around carrier frequency $f_c+BWP_1/2$ and bandwidth part $BWP_3$ around carrier frequencies $f_c-BWP_3/2$, respectively.

Figure 3:
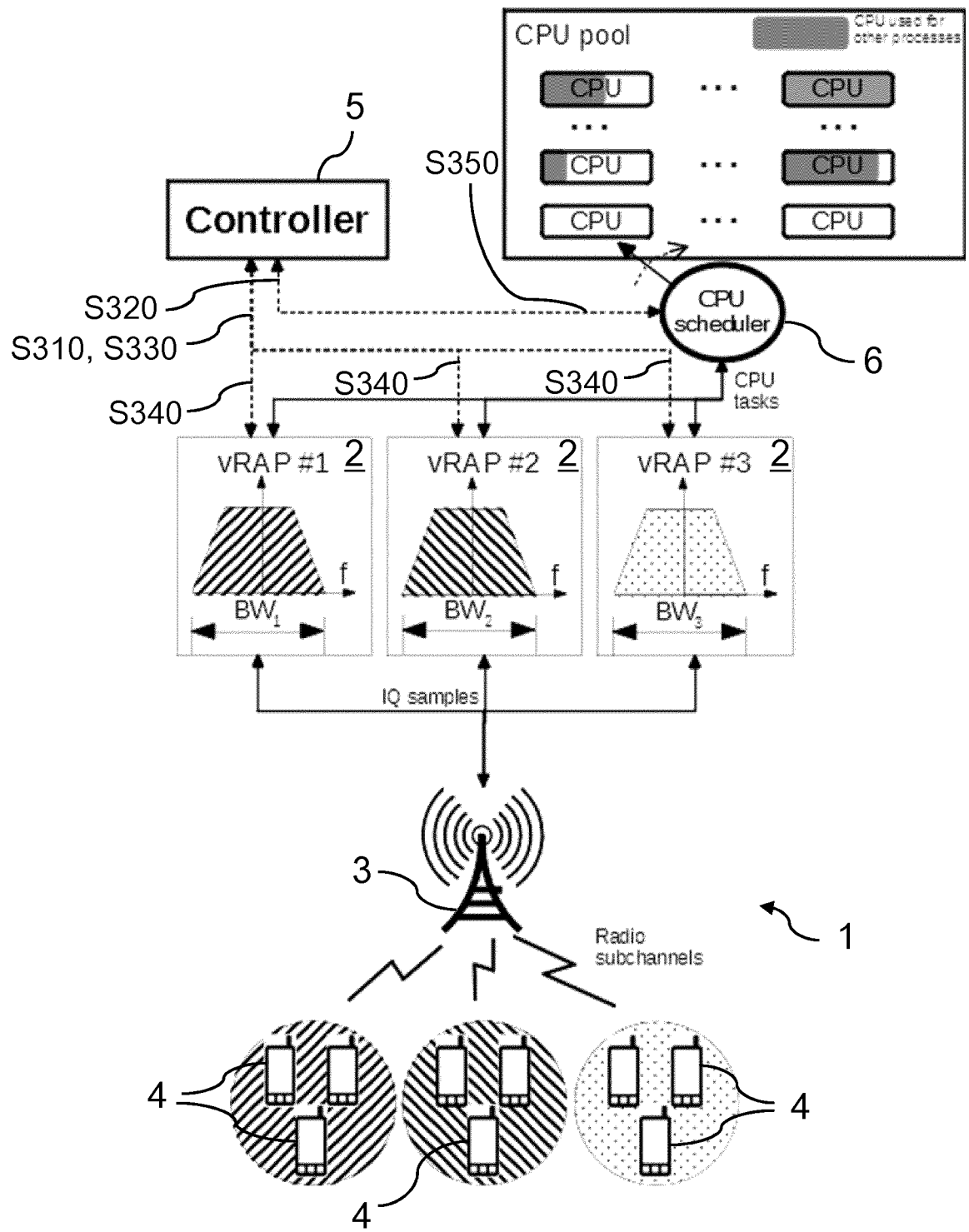
FIG. 3 is a schematic view illustrating dynamic allocation of bandwidth parts across vRAPs of a vRAN in accordance with an embodiment of the present invention.

The above allocation, which can be achieved by, e.g., using an approach described in any of the above-mentioned prior art documents, is static. Embodiments of the present invention, in contrast, aim at a dynamic allocation of bandwidth parts to vRAPs 2, allowing the system to adapt the allocation to the needs of each vRAP 2 and to the availability of computing resources. This is exemplarily shown in FIG. 3. Such dynamic allocation of bandwidth has not been addressed in prior work.

Dynamic bandwidth allocation, however, has to deal with two major challenges to devise an approach that is actually efficient:
1. A key challenge is to coordinate the allocation of bandwidth spectrum across vRAPs dynamically in the face of time-varying wireless links, data load patterns and computing availability conditions (a.k.a. contexts). The relationship between bandwidth requirements and the context is highly non-linear and hard to capture in simple mathematical models.
2. Moreover, as evidenced in the literature, there is strong correlation between bandwidth allocations and CPU requirements for virtualized radio access points. To address this issue, embodiments of the present invention optimize both BWP allocations and CPU allocations jointly.

According to embodiments of the invention, a radio resource controller is provided that performs allocation of bandwidth parts from a common shared carrier bandwidth across a number of OAPs depending on contextual information about the OAPs. A system for dynamically allocating radio resources across a set of vRAPs 2 of a vRAN 1 comprising a respective radio resource controller 5 is exemplarily shown in FIG. 3. For instance, the radio resource controller 5 may be realized in form of a machine learning (ML)-powered controller that learns to predict the needs of spectrum resources and computing resources across vRAPs depending on the contextual information and optimizes the allocation of chunks from a wider bandwidth across the vRAPs 2. The contextual information may include, but not limited to, the individual vRAPs' 2 channel condition patterns, data load patters, availability of computing resources, etc.

According to embodiments, time may be divided into scheduling slots t. For instance, the division may be made in such a way that bandwidth allocations may vary from scheduling slot t to scheduling slot t, but remain fixed within a particular scheduling slot t. The scheduling slots t may have a predefined fixed time length, which means that bandwidth allocations are performed in regular time intervals. Alternatively, it may be provided that the time length of the scheduling slots t is variable by respective configurations, thereby enabling enhanced flexibility with respect to an adaptability to sudden contextual changes of one or more of the vRAPs 2. According to an alternative embodiment, it may be provided that the time length of the scheduling slots t remains fixed, but the controller 5 is enabled to re-compute bandwidth and CPU allocations any time within a scheduling slot t, in order to react to sudden contextual changes of the vRAPs 2.

According to an embodiment, the controller 5 maintains a parametrized policy, e.g., a set of neural networks or a parametrized function that is fitted as new data comes in or is available to map encoded information about the context into optimal bandwidth and computing allocations. The workflow of the controller 5 may be implemented as follows: At the beginning of each "BWP scheduling slot" t:
1. As indicated at S310 in FIG. 3, the controller 5 is configured to receive data load context information from the vRAPs 2. At the beginning of each scheduling slot t the controller 5 employs this information to compute statistics of a set of performance indicators per vRAP 2 during the previous slot t−1. The performance indicators may include, but not limited to, mean/variance delay, throughput, decoding errors, etc.
2. As indicated at S320 in FIG. 3, the controller 5 is configured to receive CPU availability context information from the CPU scheduler 6 of the vRAN 1. At the beginning of each scheduling slot t the controller 5 employs this information to compute statistics on the CPU utilization per vRAP 2 and the CPU usage for other uses (i.e., other applications such as edge computing applications, etc.) during the previous slot t−1.
3. As indicated at S330 in FIG. 3, the controller 5 is configured to receive radio channel context information from the vRAPs 2. At the beginning of each scheduling slot t the controller 5 employs this information to compute statistics on the contextual information of each vRAP 2 during the previous slot t−1 (e.g. data arrivals for each user and vRAP 2, signal-to-noise samples for each user and vRAP 2, etc.).
4. As already mentioned above, the controller 5 may be configured to maintain an internal parametrized policy that maps context encodings into i) bandwidth parts, BWP, allocations and ii) computing resources, i.e. CPU, allocations. Using the information gathered in steps 1-3, the controller 5 may optimize the parameters of this internal policy, such that a metric of cost is minimized. The policy could consist in a set of neural networks and the parameters could be the weights of such neural networks, or any parametrized function.
5. In a next step, the controller 5 encodes the contextual information collected in step 3. The encoding may be performed by, e.g., using an autoencoder or some other aggregation functions (e.g., average). The controller 5 then executes the current policy (i.e., as optimized in step 4.) to obtain i) the bandwidth parts, BWP allocations and ii) CPU allocations for the next scheduling slot. As already mentioned above, it may be provided that the controller 5 may re-compute BWP and CPU allocations any time within a particular scheduling slot tin case of sudden contextual changes.

6. As indicated at S340 in FIG. 3, the controller 5 notifies individual vRAPs 2 of the new BWP allocations, which should be enforced in scheduling slot t+1.

7. Although not explicitly shown in FIG. 3, each individual vRAP 2 signals their own users 4 the new BWP allocations to occur in scheduling slot t+1. Such signaling could be done repeatedly within scheduling slot t for redundancy or in case of sudden contextual changes (upon new allocations coming from the controller 5).

8. As indicated at S350 in FIG. 3, at the end of scheduling slot t, the controller 5 configures the CPU scheduler 6 to enforce the computed CPU allocations and the PHY hypervisor (not shown, to enforce the computed BWP allocations.

According to an embodiment, a control communication channel may be provided that is used in order to communicate the dynamic allocations from the vRAP 2 to their associated users 4. More specifically, the control communication channel may be established to advertise the users 4 the channel (i.e., the allocated BWP) they need to tune to and its characteristics, namely, central frequency and bandwidth. For instance, this information can be encoded into the Downlink Control Information (DCI) in 3GPP, according to the signaling mechanisms defined for bandwidth parts (MVPs) in 3GPP IS 38.211 (release 15), which is incorporated herein in its entirety by way of reference.

Figure 4:
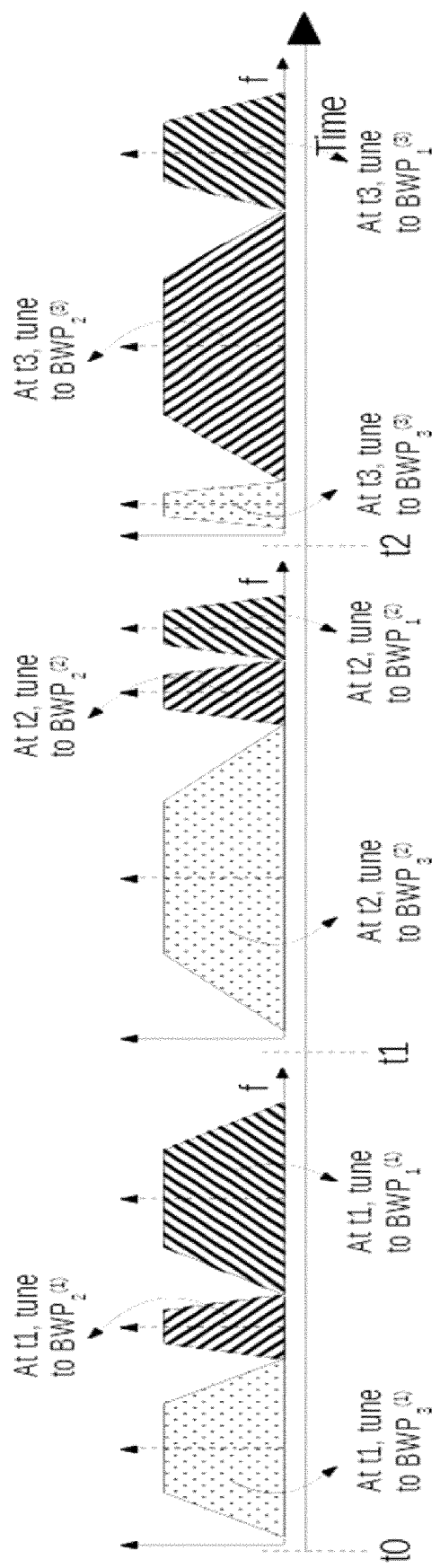
FIG. 4 is a schematic view illustrating a system for dynamically allocating radio resources across a set of vRAPs of a vRAN in accordance with an embodiment of the present invention.

Assuming a division of time into scheduling slots, as described above, in each scheduling slots t, the control communication channel shall encode the BWP allocations made for the next slot t+1. Such signaling can be done at least once within each slot, but it can be repeated multiple times within a particular slot for redundancy. This allows to provide dynamic allocation of spectrum across vRAPs 2 while preserving synchronization between the users 4 and their vRAP A possible outcome of a dynamic allocation of bandwidth parts across vRAPs 2, e.g. executed by the radio resource controller 5 of FIG. 3, for instance in accordance with the workflow described above, is shown in FIG. 4. Specifically, FIG. 4 illustrates the bandwidth allocation for the three vRAPs 2 of FIG. 3 in three subsequent scheduling slots t (starting at t0, t1, and t2, respectively). As discussed above and as shown in FIG. 4, in order to preserve synchronization between the users 4 and their vRAPs 2, advertisements via the control communication channel are made in advance, i.e. within a particular scheduling slot t, users 4 are informed of the characteristics of the channel to use within the next scheduling slot t+1. As will be appreciated by those skilled in the art, advertisements of bandwidth allocations can be made at an even earlier stage. For instance, if required or if appropriate, users 4 can be generally informed within a particular scheduling slot t of the characteristics of the channel to use within any subsequent predefined scheduling slot, e.g. scheduling slot t+2.

Figure 5:
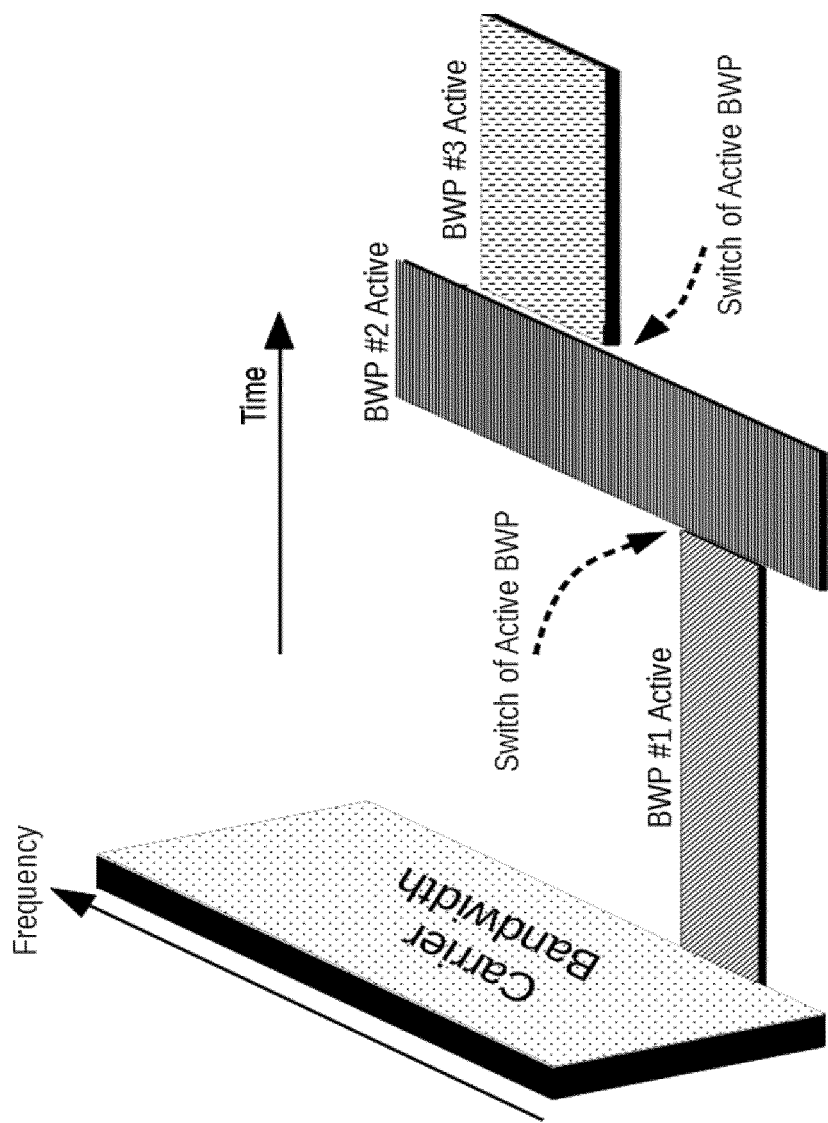
FIG. 5 is a schematic view illustrating a carrier bandwidth with switches between active bandwidth parts.

FIG. 5 illustrates the process of switching between different allocated MVPs from the perspective of a particular vRAP 2. The illustration is in line with the provisions of 3GPP 38.211, which is incorporated herein in its entirety by way of reference. According to the technical specifications provided in the named standardization document, a BWP is defined as a contiguous set of physical resource blocks (PRBs) on a given carrier bandwidth (CB). These PRBs are selected from a contiguous subset of the common resource blocks (CRBs) for a given numerology ($\mu$). According to 3GPP's specification on BWPs, UE can be configured only with up to four BWPs in downlink and uplink out of which only one is active at every given moment but can roam across the configured BWPs using different signaling mechanisms. This is illustrated in FIG. 5.

According to ETSI TS 38.321-5.15, which is incorporated herein in its entirety by way of reference, Bandwidth Part (BWP) operation, BWP selection or BWP switching can be done by Dedicated RRC Signaling Over PDCCH channel Downlink control information (DCI)-DCI 0_1 (UL Grant) and DCI 1_0 (DL Scheduling)

By bwp-inactivityTimer—ServingCellConfig.bwp-InactivityTimer

By MAC CE (Control Element)

It should be noted that 3GPP's BWP have been introduced to allow UEs to operate in narrow bandwidth to save energy and/or use wider bandwidth chunks only during sudden load surges.

According to embodiments of the invention, the above approach may be re-engineered in the following way. The PHY hypervisor operates with the physical radio resources of a carrier bandwidth (CB). The controller 5 then computes a set of K (a configurable parameter) virtual BWP vectors $\vec{b}_k$, each element $b_{k,i}$ of the BWP vector being an eligible BWP for each vRAP i. For instance, in case there are three vRAPs 2 and the CB is equal to 40 MHz, a possible set of BWP vectors is {[5 25 10], [25 10 5], [10, 5, 25], [25, 5, 10], [10, 25, 5]} MHz. In this way, when online, the controller 5 can select one BWP vector out of such set at every slot interval.

This computation can be done, for instance, by solving a combinatorial optimization problem with, at least, the following constraints. A first constraint ensures that each BWP vector does not exceed capacity, i.e., does not exceed the amount of bandwidth provided by the CB. This constraint can be expressed as follows:

$$\sum_i b_{k,i} \leq B, \forall k = \{1, \ldots, K\}$$

where B MHz is the amount of bandwidth provided by the CB.

A second constraint guarantees that each vRAP 2 is not given a set of eligible BWPs that exceed the maximum allowed for configuration on its UEs 4, four BWPs according to 3GPP IS 38.321-5.15, as mentioned above.

$$|\{b_{k,i}\}_{\forall k=\{1,\ldots,K\}}| \leq M_i \forall i$$

where $M_i$ is the maximum amount of BWP configurations allowed by the users of vRAP i, $\{b_{k,i}\}_{\forall k=\{1,\ldots,K\}}$ is the set of distinct BWPs eligible for vRAP i across all vectors $\vec{b}_k$ computed by the controller, and |·| simply indicates the cardinality of a set, i.e., the number of distinct BWPs eligible for the vRAP.

Another constraints, such as, per-vRAP restrictions on which BWPs can be eligible, can be accommodated too.

In addition to said constraints, the set of BWP vectors computed by the controller 5 should provide a wide range of BWPs to individual vRAPs 2 to guarantee that they can use a high-band-width BWP when its load increases, a lowbandwidth BWP otherwise, and a sufficiently diverse amount of BWPs in between to accommodate as many load regimes as possible. Such diversity can be achieved by formulating a cost function that minimizes a distance metric $d(\cdot,\cdot)$ between the set of BWPs for each vRAP i ($\{b_{k,i}\}_{\forall k=\{1,\ldots,K\}}$) and the full set of eligible BWPs for that vRAP (the most diverse set of BWPs possible) Examples of such metric can be, e.g., Hausdorff distance, i.e., $$\min_{\{\vec{b}_k\}_{\forall k=\{1,\ldots,K\}}} \sum_i d(\{b_{k,i}\}_{\forall k=\{1,\ldots,K\}}, \beta_i)$$

s.t. constraints

Utility functions can be used to guarantee fairness across the diversity of BWPs of all vRAPs 2, e.g., $$\min_{\{\vec{b}_k\}_{\forall k=\{1,\ldots,K\}}} \sum_i -\log(d(\{b_{k,i}\}_{\forall k=\{1,\ldots,K\}}, \beta_i))$$

s.t. constraints

In this way, according to an embodiment of the invention, a bootstrapping process may be implemented, in which the system is configured to execute the following steps:
1) The controller 5 computes the set of BWP vectors.
2) From the computed set of BWP vectors, one vector is chosen as an initial BWP vector containing default BWPs for each vRAP 2.
3) The controller 5 signals to each vRAP 2 the set of eligible BWPs which, accordingly, could be used by the PHY hypervisor, and its default BWP.
4) The system iterates in time intervals following a schedule, e.g., in a round-robin fashion, across all vRAPs 2. At each interval, one different vRAP 2 activates and communicates to its users 4, using all the bandwidth of the CB, the eligible BWPs and the default BWP, which should become active when the system has finished iterating across vRAPs 2. To this means, the bwp-inactivityTimer described in 3GPP TS 38.321-5.15's can be used.
5) Once all vRAPs 2 have been configured, the system enters in an online mode.

In online mode, the controller 5 only needs to select the most appropriate BWP vector out of the pre-computed set given the current contextual information as explained earlier.

Hence, in view of the above, a method for slicing a radio channel in virtual radio access networks (vRANs) according to an embodiment of the invention may comprise the steps of
1) Measuring contextual information across all vRAPs, including CPU availability, channel quality temporal patters or buffer state patters;
2) Computing a set of BWP vectors containing MVPs eligible for each vRAP such that the eligible BWPs for individual vRAPs across all vectors maximize a distance function that guarantees diversity; and
3) Mapping such (encoded) contextual information into an allocation of CPU resources and an optimal BWP vector.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMBERS 1 virtual radio access network, vRAN
2 virtual radio access point, vRAP
3 physical radio access point
4 user/UE
5 radio resource controller
6 CPU scheduler

The invention claimed is:
1. A method for dynamically allocating radio resources across a set of virtualized radio access points (vRAPs) in a virtual radio access network (vRAN), the method comprising:
collecting contextual information across all vRAPs that share a common carrier bandwidth of a physical radio access point,
mapping, by a radio resource controller according to an internal mapping policy, the contextual information of the vRAPs into an allocation of vRAN slices to the vRAPs, wherein each vRAN slice comprises allocated computing resources and an allocated bandwidth part (BWP) of the common carrier bandwidth, the BWPs being orthogonal across the vRAN slices,
computing, by the radio resource controller, a set of BWP vectors containing BWPs eligible for each vRAP such that the eligible BWPs for individual vRAPs across all vectors maximize a distance function, and
notifying the vRAPs of their individual BWP allocations.

2. The method according to claim 1, wherein the contextual information of a vRAP include computing availability conditions, channel quality temporal patterns, and/or buffer state patterns.

3. The method according to claim 1, wherein the radio resource controller's internal mapping policy comprises a set of neural networks, wherein the weights of the neural networks are parameters of the radio resource controller's internal mapping policy.

4. The method according to claim 1, further comprising:
computing, by the radio resource controller, statistics of a set of performance indicators per vRAP and/or on computing resource utilization per vRAP, and
adapting, by the radio resource controller, parameters of its internal mapping policy based on the computed statistics.

5. The method according to claim 1, further comprising:
iterating in time intervals across all vRAPs following a predefined schedule, and
activating, at each time interval by a different one of the vRAPs, the eligible BWPs and a default BWP, which should become active when iterating across the vRAPs has finished, and communicating the eligible BWPs and the default BWP to its users.

6. The method according to claim 1, further comprising:
providing a control communication channel, and
advertising, by individual vRAPs, channel characteristics of the allocated radio resources to the users associated with the respective vRAP via the control communication channel.

7. The method according to claim 1, wherein an advertisement of channel characteristics of the radio resources allocated to a particular vRAP includes information about the central frequency and the bandwidth of the allocated radio resources.

8. The method according to claim 1, wherein information on the channel characteristics of the radio resources allocated to a particular vRAP are encoded into the Downlink Control Information, DCI.

9. The method according to claim 1, further comprising:
dividing time into scheduling slots, and
notifying, by the radio resource controller, individual vRAPs within a scheduling slot t of BWP allocations made for the respective next scheduling slot t+1.

10. The method according to claim 9, further comprising:
re-computing, by the radio resource controller, computing resources BWP allocations within a scheduling slot in case of changes of a vRAP's context.

11. A system for dynamically allocating radio resources across a set of virtualized radio access points (vRAPs) in a virtual radio access network (vRAN), the system comprising:
a radio resource controller that is configured to:
execute a mapping policy that maps contextual information collected across all vRAPs that share a common carrier bandwidth of a physical radio access point into an allocation of vRAN slices to the vRAPs, wherein each vRAN slice comprises allocated computing resources and an allocated bandwidth part (BWP) of the common carrier bandwidth, the BWPs being orthogonal across the vRAN slices,
compute a set of BWP vectors containing BWPs eligible for each vRAP such that the eligible BWPs for individual vRAPs across all vectors maximize a distance function, and
notify the vRAPs of their individual BWP allocations.

12. The system according to claim 11, wherein the radio resource controller's mapping policy comprises a set of neural networks, wherein the weights of the neural networks are parameters of the radio resource controller's internal mapping policy.

13. The system according to claim 11, further comprising:
a control communication channel configured to transmit advertisements of channel characteristics of radio resources allocated to an individual vRAP from the vRAP to the users that are associated with the vRAP.

* * * * *